UNITED STATES PATENT OFFICE.

CARL WILHELM HEINRICH GÖPNER AND HEINRICH LUDWIG DIEHL, OF HAMBURG, GERMANY.

RECOVERY OF GOLD AND SILVER FROM THEIR SOLUTIONS.

SPECIFICATION forming part of Letters Patent No. 580,683, dated April 13, 1897.

Application filed October 5, 1896. Serial No. 607,947. (No specimens.)

*To all whom it may concern:*

Be it known that we, CARL WILHELM HEINRICH GÖPNER, residing at 46 and 48 Canalstrasse, Uhlenhorst, and HEINRICH LUDWIG DIEHL, residing at 8 Kl. Grassbrook Vogelreth, Hamburg, Germany, citizens of Germany, have invented certain new and useful Improvements in the Recovery of Gold and Silver from Their Solutions, of which the following is a specification.

The leaching of auriferous ores or tailings by solutions of potassium cyanid gives solutions containing free alkali, the gold in solution as potassium aurocyanid or sometimes as potassium auricyanid and a large excess of potassium cyanid. When silver is present in the ores or tailings, it is also found in the solution as a cyanid.

This invention relates to the treatment of such solutions in such a manner as to effect precipitation of the gold and silver cyanids and regeneration of the leaching material. For this purpose the solution resulting from the leaching has added to it cuprous cyanid, which is acted on by the potassium cyanid, forming soluble cuprous potassic cyanid, according to the equation $$6KCN + Cu_2(CN)_2 = Cu_2K_6(CN)_8.$$

There is then added an acid, such as sulfuric acid, capable of decomposing potassium cyanid, whereupon the ingredients of the solution are decomposed, forming hydrocyanic acid and potassium sulfate, which remain in solution, while auro or auri cyanid and cuprous cyanid are precipitated, as well as silver cyanid, when there is silver in the solution treated, according to the equation

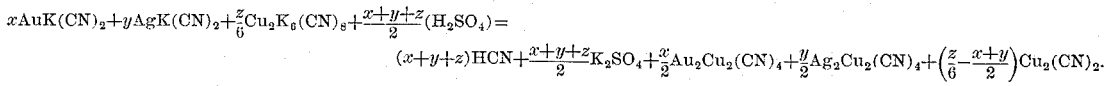

$$xAuK(CN)_2 + yAgK(CN)_2 + \tfrac{z}{6}Cu_2K_6(CN)_8 + \tfrac{x+y+z}{2}(H_2SO_4) = (x+y+z)HCN + \tfrac{x+y+z}{2}K_2SO_4 + \tfrac{x}{2}Au_2Cu_2(CN)_4 + \tfrac{y}{2}Ag_2Cu_2(CN)_4 + \left(\tfrac{z}{6} - \tfrac{x+y}{2}\right)Cu_2(CN)_2.$$

In the practice of the process it is of advantage to add the cuprous cyanid in excess, so as to render the precipitation of the gold as complete as possible, the precipitate consisting then of aurocuprous cyanid and cuprous cyanid. The solution, decanted or otherwise separated from the precipitate, is slightly supersaturated with caustic potassa, so as to produce fresh potassium cyanid, which can be used again for leaching. The reaction is according to the equation

$$HCN + KOH = KCN + H_2O.$$

In order to obtain gold in the precipitate in sufficient amount to render it suitable for treatment to recover the gold, the precipitate from the first operation is dissolved wholly or partially in a fresh quantity of the solution obtained by the leaching, and fresh cuprous cyanid is added, if necessary, and then acid to effect a fresh precipitation, and this may be repeated a number of times until sufficient gold is accumulated. When cuprous cyanid is added in considerable quantities in the first operation, a number of successive precipitations may be effected without further additions of cuprous cyanid.

The process described is applicable where the solution obtained by leaching already contains copper, but in such case the quantity of cuprous cyanid added may be less than when no copper is present.

When silver as well as gold is present in the solution obtained from the leaching, the process may be modified as follows: A soluble salt of silver, such as the nitrate or sulfate, is added to the solution, but not in such quantity as to effect precipitation. If nitrate of silver is used, the reaction may be expressed by the equation

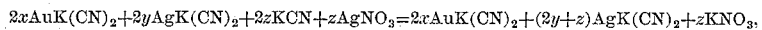

$$2xAuK(CN)_2 + 2yAgK(CN)_2 + 2zKCN + zAgNO_3 = 2xAuK(CN)_2 + (2y+z)AgK(CN)_2 + zKNO_3,$$

or a silver salt insoluble in water, such as the cyanid or the chlorid, may be added, but the quantity should be such that very little of it remains undissolved in the solution. Acid is then added, and thus the silver as well as the gold is precipitated as a cyanid, as appears from the equation

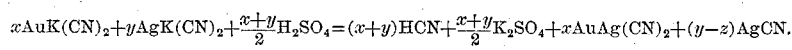

$$xAuK(CN)_2 + yAgK(CN)_2 + \tfrac{x+y}{2}H_2SO_4 = (x+y)HCN + \tfrac{x+y}{2}K_2SO_4 + xAuAg(CN)_2 + (y-z)AgCN.$$

The quantity of silver salt added should be such that the silver in it, together with that in the solution treated, should be considerably in excess of the gold.

A mixture of a soluble salt or insoluble silver compound with cuprous cyanid may be used instead of simply a silver compound or cuprous cyanid.

In the leaching and precipitation processes sodium cyanid may be used instead of potassium cyanid, this being regenerated by adding soda instead of potassa to the solution separated from the precipitate. Also mixtures of sodium and potassium cyanids may be used for leaching and may be regenerated from the separated solution.

Having now particularly described and ascertained the nature of our said invention and in what manner the same is to be performed, we declare that what we claim is—

1. The process hereinbefore described for precipitating gold and silver from their cyanid solutions, said process consisting in adding to these solutions cuprous cyanid and then adding an acid, substantially as described.

2. The process described for the precipitation of gold and silver from their cyanid solutions, which consists in adding to said solutions a considerable quantity of cuprous cyanid then adding an acid to effect precipitation, dissolving the latter by a fresh quantity of the cyanid solution obtained by leaching, and then adding acid to effect successive precipitations from said solution, substantially as described.

In testimony whereof we have signed our names to this specification, in the presence of two subscribing witnesses, this 22d day of September, A. D. 1896.

CARL WILHELM HEINRICH GÖPNER.
HEINRICH LUDWIG DIEHL.

Witnesses:
E. HH. MUMMENHOFF,
CHAS. H. BURKE.